(12) United States Patent
Liang et al.

(10) Patent No.: US 8,596,411 B2
(45) Date of Patent: Dec. 3, 2013

(54) SPEAKER CABINET FOR ELECTRONIC DEVICE

(75) Inventors: Chen-Yi Liang, Taipei Hsien (TW); Chien-Heng Kuo, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 0 days.

(21) Appl. No.: 13/603,757

(22) Filed: Sep. 5, 2012

(65) Prior Publication Data

US 2013/0248281 A1    Sep. 26, 2013

(30) Foreign Application Priority Data

Mar. 22, 2012  (TW) .............................. 101109964 A (51) Int. Cl.
*A47B 81/06*    (2006.01)
(52) U.S. Cl.
USPC ............................ 181/199; 181/198; 181/207
(58) Field of Classification Search
USPC .......................................... 181/207, 199, 198
See application file for complete search history.

(56) References Cited

U.S. PATENT DOCUMENTS

| | | | | |
|---|---|---|---|---|
| 6,675,930 B2 * | 1/2004 | Sugiyama et al. | ............ | 181/148 |
| 6,786,298 B1 * | 9/2004 | Chang et al. | ................. | 181/207 |
| 6,912,866 B2 * | 7/2005 | Seo et al. | ......................... | 62/295 |
| 7,137,268 B2 * | 11/2006 | Cook et al. | ...................... | 62/296 |
| 8,002,078 B2 * | 8/2011 | Chan et al. | ..................... | 181/151 |
| 8,040,021 B2 * | 10/2011 | Blanchard et al. | ............ | 310/339 |
| 8,151,929 B2 * | 4/2012 | Chan et al. | ..................... | 181/151 |
| 2006/0054379 A1 * | 3/2006 | Chang | ........................... | 181/207 |
| 2009/0242322 A1 * | 10/2009 | Tsai | ............................... | 181/207 |
| 2009/0283658 A1 * | 11/2009 | Keene | ............................ | 248/559 |
| 2009/0288911 A1 * | 11/2009 | Chen et al. | .................. | 181/199 |
| 2010/0206661 A1 * | 8/2010 | Chan et al. | .................... | 181/207 |

FOREIGN PATENT DOCUMENTS

CN    101114183 A    1/2008

* cited by examiner

*Primary Examiner* — Forest M Phillips
(74) *Attorney, Agent, or Firm* — Rosenberg, Klein & Lee (57) ABSTRACT

The present disclosure relates to a speaker cabinet for electronic device, which is disposed in an electronic device and comprises a cabinet body, two first fixing structures, two dampers, and two second fixing structures. The damper is disposed on two side surfaces of the cabinet body through the two first fixing structures and fixed on the electronic device through the two second fixing structures for fixing the cabinet body in the electronic device. The cabinet speaker according to the present disclosure adopts only two fixing structures to fix the cabinet body to the electronic device. The damper is also used for mitigating the vibrations generated by the cabinet body. In addition, the two fixing structures are used for supporting the damper for avoiding inclination of the cabinet body towards an unpredictable direction and colliding the housing of the electronic device and its internal components.

19 Claims, 12 Drawing Sheets

SPEAKER CABINET FOR ELECTRONIC DEVICE

FIELD OF THE DISCLOSURE

The present disclosure relates generally to a speaker cabinet, and particularly to a speaker cabinet for electronic device.

BACKGROUND OF THE DISCLOSURE

Modern electronic technologies develop so rapidly that various electronic devices prevail in the society. The operating functions of electronic devices are getting stronger; the processing speed grows drastically as well. Electronic devices, such as notebook computers, mobile phones, multimedia players, and personal digital assistants have become an indispensable part in people's learning, entertainment, and working lives. Their lightness, small size, convenient portability, and powerful functions appeal increasingly to the market and consumers, leading to adoption by the public.

A general portable consumer electronic product, such as a notebook computer or tablet computer, is equipped with multiple cabinets for speaker inside its housing for providing better audio performance. The structure of the speaker cabinet is designed according to the housing of electronic products. Thereby, the cabinets for speaker of consumer electronic products are mainly designed in light, thin, and small-sized forms. The cabinets for speaker will vibrate during operation, and hence affecting the access rate of hard disks or CD-ROM drives of electronic products. Even worse, hard disks or CD-ROM drives might completely stop operating owing to the vibration. In addition, when the vibration produced by cabinets for speaker is transmitted to the housing, the user's operating experience will be affected as well. For avoiding transmission of the vibration produced by cabinets for speaker to hard disks, CD-ROM drives, or housings, according to the prior art, dampers are disposed onto the structure connecting the speaker and the housing.

For example, the cushioning method according to the prior art uses a bolt passing through the speaker cabinet for fastening it on the housing. A damper is slip on the bolt. The vibration produced by the speaker cabinet is absorbed by means of the deformation of the cushion. Nonetheless, the cushion is not provided with sufficient support. Consequently, when the cushion deforms, the speaker cabinet may incline towards an unpredictable direction and contact the components inside the electronic device. Besides, it is required to dispose multiple bolts, each having the cushion, for fixing the speaker cabinet. Thereby, the manufacturing costs and assembly time will be raised.

Accordingly, the present disclosure provides a speaker cabinet for electronic device. The speaker cabinet is fixed by using a small amount of fixing structures. In addition, the damper is supported for avoiding inclination of the speaker cabinet towards an unpredictable direction during deformation of the cushion. Furthermore, the manufacturing costs and assembly time can be reduced.

SUMMARY

An objective of the present disclosure is to provide a speaker cabinet for electronic device, which, by fixing a damper on a cabinet body via two fixing structures and supporting the damper on the cabinet body, the cabinet body is disposed on a housing of an electronic device. Thereby, when the cabinet body vibrates, no inclination towards an unpredictable direction will occur, and thus preventing continuous collisions on the housing of the electronic device or on its internal components and producing noises. In addition, the manufacturing costs and assembly time can be reduced as well.

Another objective of the present disclosure is to pro de a speaker cabinet for electronic device, which mitigates the vibration produced by the cabinet body.

Still another objective of the present disclosure is to provide a speaker cabinet for electronic device, which mitigates the vibration produced by the cabinet body using the damper by the assistance of the two fixing structures having flexibility.

The present disclosure provides a speaker cabinet for electronic device, which is disposed in an electronic device, and comprises a cabinet body, two first fixing structures, two dampers, and two second fixing structures. The cabinet body has two opposite side surfaces. The two first fixing structures are disposed on the two side surfaces of the speaker cabinet, respectively. The two dampers have a hole, respectively. The two first fixing structures pass through the hole, respectively. The two second fixing structures are disposed in a housing of the electronic device and disposed on the corresponding damper, respectively.

DETAILED DESCRIPTION

In order to make the structure and characteristics as well as the effectiveness of the present disclosure to be further understood and recognized, the detailed description of the present disclosure is provided as follows along with embodiments and accompanying figures.

In the speaker cabinet for electronic device according to the prior art, the speaker cabinet is disposed directly on the housing the electronic device using dampers. Nonetheless, the speaker cabinet produces vibration during operation, and thus deforming the dampers. Because there are no fixing members to support the dampers, the deformation of the dampers tends to lead to inclination of the speaker cabinet towards an unpredictable direction and contacts of the speaker cabinet with the housing and other components disposed in the housing. Accordingly, noises are generated. The present disclosure provides a speaker cabinet for electronic device for solving the problems described above.

Figure 1:
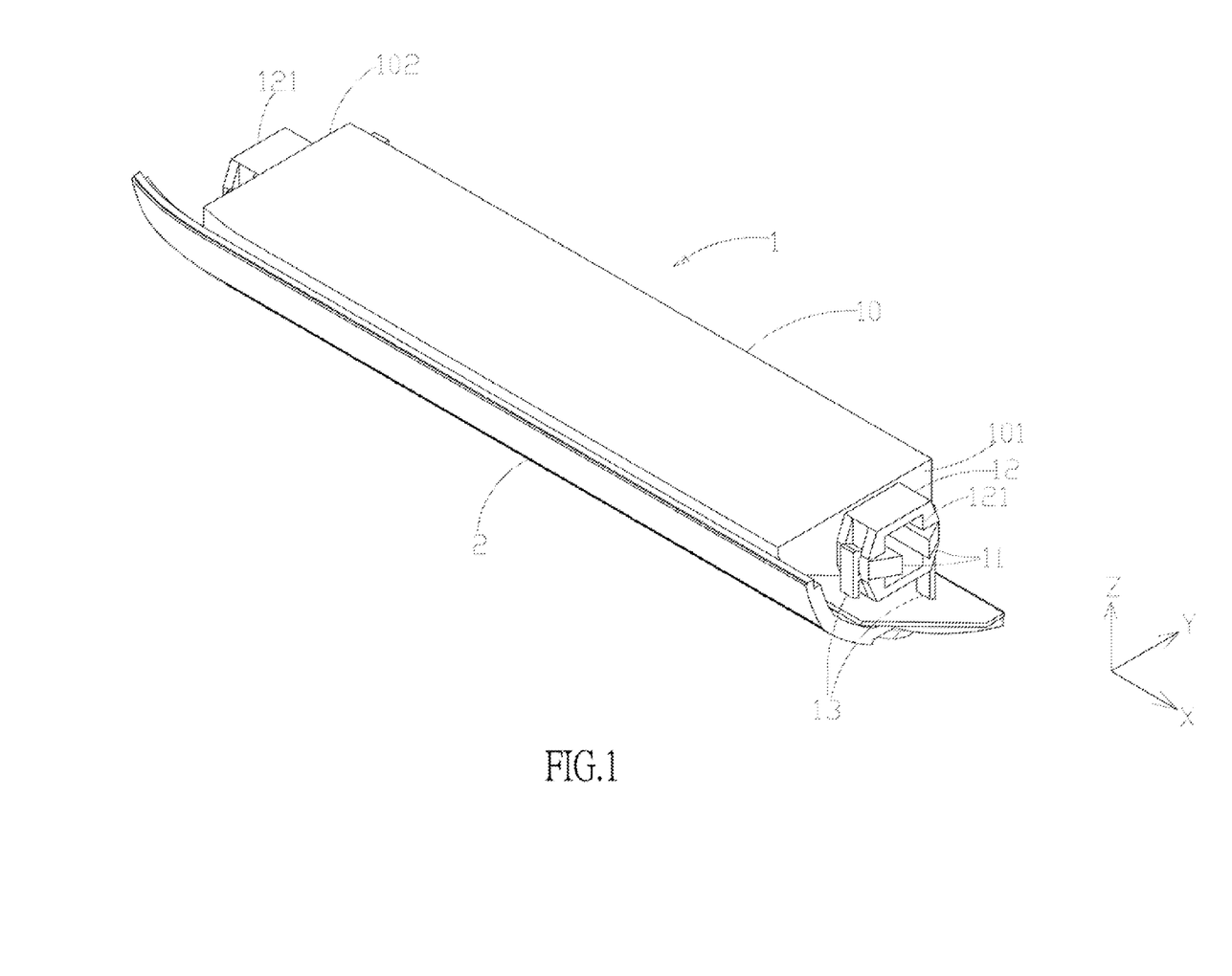
FIG. 1 shows a three-dimensional view of the speaker cabinet according a first embodiment of the present disclosure.
Figure 2:
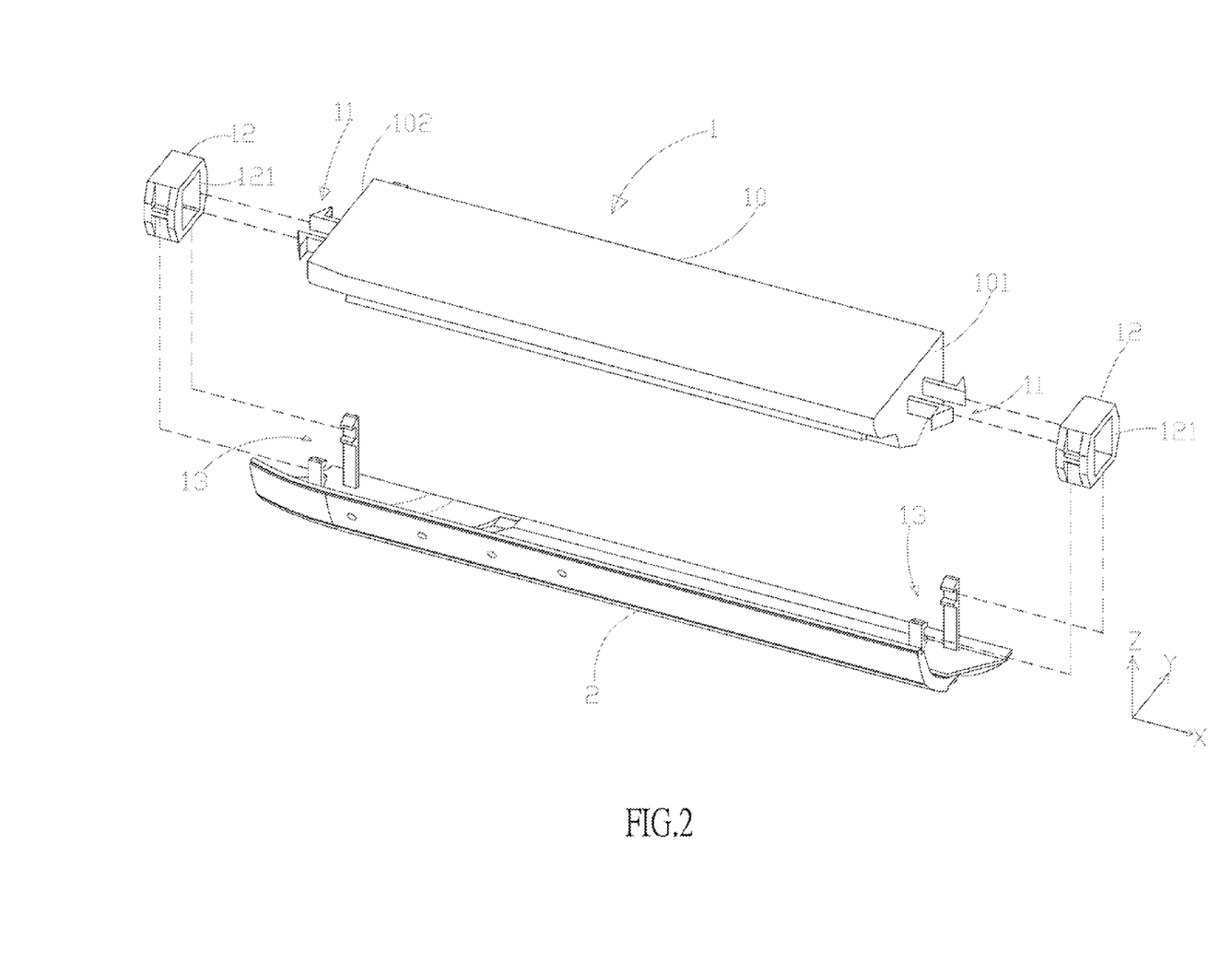
FIG. 2 shows an exploded view of the speaker cabinet according the first embodiment of the present disclosure.

FIGS. 1 and 2 show a three-dimensional view and a cross-sectional view of the speaker cabinet according a first embodiment of the present disclosure. As shown in the figures, the present disclosure provides a speaker cabinet 1 for electronic device. The speaker cabinet 1 is disposed in an electronic device, which can be, but not limited to, a notebook computer, a tablet computer, a personal digital assistant, and a smart phone.

The speaker cabinet according to the present embodiment comprises a cabinet body 10, two first fixing structures 11, two dampers 12, and two second fixing structures 13. The cabinet body 10 has a first side surface 101 and a second side surface 102 corresponding to each other. The two first fixing structures 11 are disposed on the first and second side surfaces 101, 102, respectively. The two dampers 12 have a hole 121, respectively. Each fist fixing structure 11 passes through the hole 121 of the corresponding damper 12 and fixes the corresponding cushion damper 12 on the cabinet body 10. The two second fixing structures 13 are disposed on the inner surface of a housing 2 of the electronic device and on the corresponding dampers 12. Thereby, by disposing the two dampers 12 located on the two first fixing structures 11 on the two second fixing structures 13, the two second fixing structures 13 support the two dampers 12, and hence achieving the purpose of disposing the cabinet body 10 on the housing 2.

It is known from the above that the cabinet body 10 contacts the two second fixing structures 13 located on the housing 2 via the two first fixing structures 11 located on the first and second side surfaces 101, 102 of the cabinet body 10 and the two dampers 12 slip on the two first fixing structures 11. Namely, only the first and second side surfaces 101, 102 of the cabinet body 10 contact the housing 2; the other surfaces of the cabinet body 10 do not contact the housing 2. Hence, the contact area between the cabinet body 10 and the housing 2 is reduced, and thus reducing the possibility of noises produced by the collision between the cabinet body 10 and the housing 2 when the cabinet body 10 vibrates. In addition, the dampers 12 are supported by the two first fixing structures 11 and the two second fixing structure 13. When the cabinet body 10 vibrates, inclination of the cabinet body 10 towards an unpredictable direction due to deformation of the dampers 12 can be avoided. Furthermore, collisions between the cabinet body 10 and the housing 2 or other internal components can be prevented as well.

When the cabinet body 10 vibrates during; operation, the vibration of the cabinet body 10 is multi directional. The cabinet body 10 drives the two first fixing structures 11 located on the first and second side surfaces 101, 102 and the two dampers 12 disposed on the two first fixing structures to vibrate. When the dampers 12 vibrates as the cabinet body 10 does, both sides of the dampers 12 are fixed on the second fixing structures 13, respectively. The cabinet body 10 gives the dampers 12 an action force, which deforms the middle part of the dampers 12 with respect to their both sides and makes the dampers 12 to produce a counterforce. The counterforce of the dampers 12 and the action force provided by the cabinet body 10 cancel out, and thus mitigating the vibration of the cabinet body 10.

Nonetheless, the first and second fixing structures 11, 13 are flexible, which can shake as the cabinet body 10 vibrates. If the first and second fixing structures 11, 13 are rigid, they are prone to breaks when the cabinet body 10 vibrates excessively. Since the first and second fixing structures 11, 13 according to the present embodiment are flexible, the problem described above will not occur. Because the first and second fixing structure 11, 13 according to the present embodiment are flexible, when the dampers 12 vibrate as the cabinet body 10 does, the first and second fixing structures 11, 13 can shake elastically as the dampers 12 vibrate. Thanks to their flexibility, the first and second fixing structures 11, 13 can generate a recovery force. The recovery force together with the counterforce generated by the dampers 12 can cancel out more action force provided by the cabinet body 10. Thereby, the first and second fixing structures 11, 13 according to the present embodiment can help the dampers 12 to mitigate the vibrations produced, by the cabinet body 10. Besides, although the second fixing structure 13 vibrates as the dampers 12, it will not make the cabinet body 10 to incline towards an unpredictable direction. Consequently, the collisions, and hence the noises, between the cabinet body 10 and the internal components can be avoided. According to the above description, the cabinet body 10 is not completely fixed on the housing 2. The shakes of the flexible first and second fixing structures 11, 13 help the dampers 12 to mitigate the vibrations of the cabinet body 10.

Refer again to FIG. 1. The two first fixing structures 11 according to the present embodiment are disposed on the first and second side surfaces 101, 102 of the cabinet body 10, respectively. Because the two first fixing structures 101 have identical structures, only the first fixing structure 11 disposed on the first side surface 101 is described in details. Please refer to FIG. 3 and FIG. 4 altogether, which show partially enlarged views of FIG. 1 and FIG. 2 according to the first embodiment of the present disclosure. As shown in the figure, the first fixing structure 11 according to the present embodiment is composed by two first fixing members 111 disposed symmetrically on the first side surface 101 of the cabinet body 10.

Figure 3:
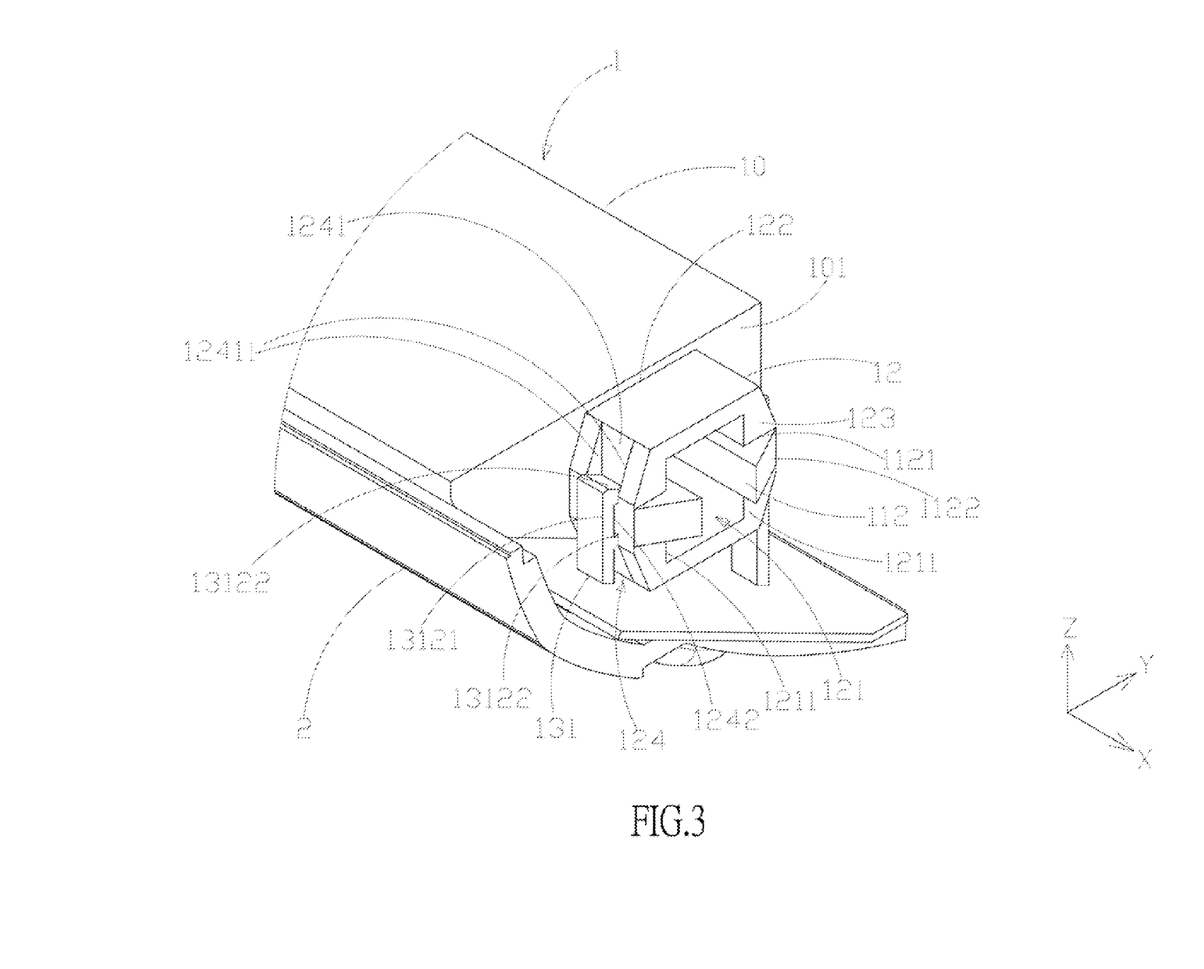
FIG. 3 shows a partially enlarged view of FIG. 1 according the first embodiment of the present disclosure.
Figure 4:
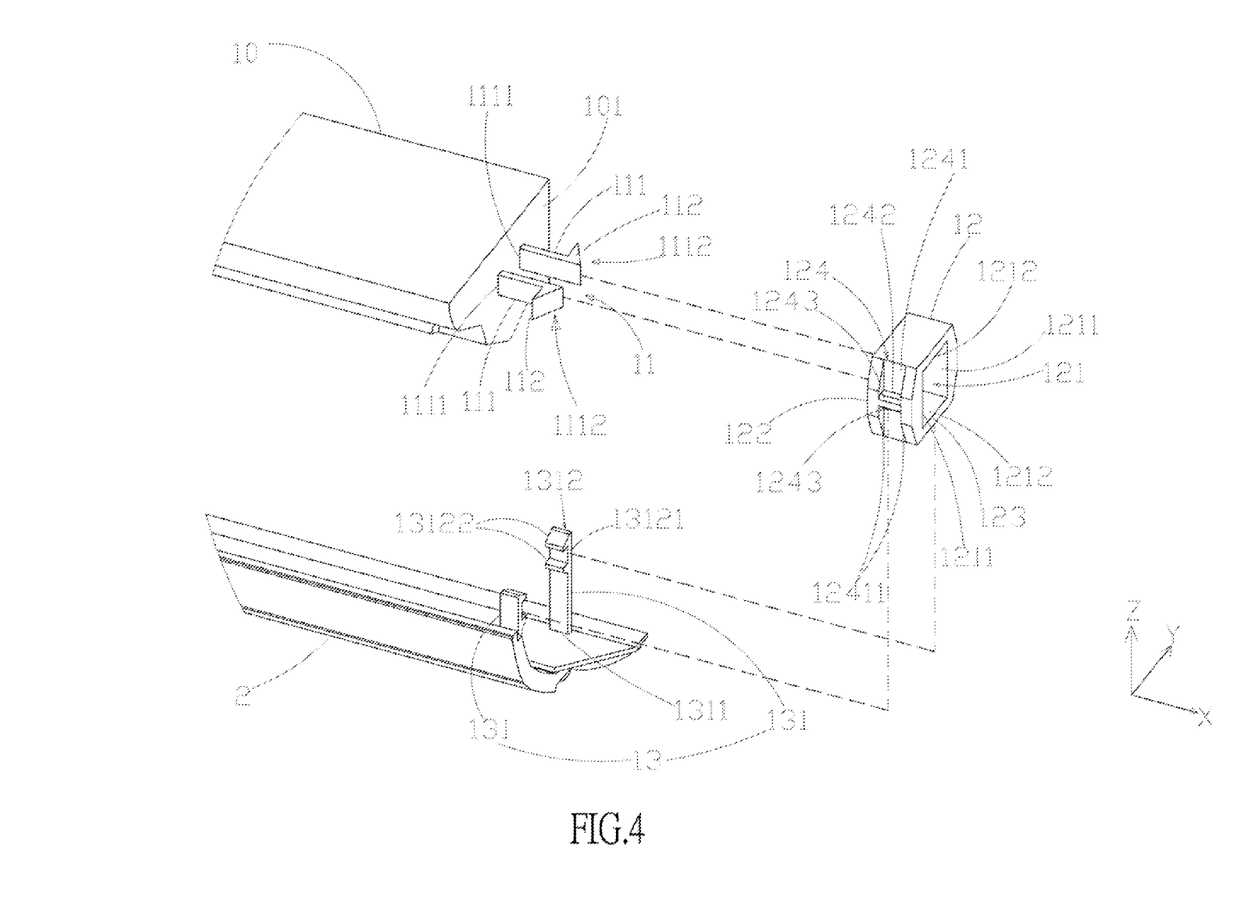
FIG. 4 shows a partially enlarged view of FIG. 2 according the first embodiment of the present disclosure.

Each first fixing member 111 has a first end 1111 and a second end 1112. The first end 1111 of the first fixing member 111 is disposed on the first side surface 101 of the cabinet body 10. The second end 1112 has a first hook 112. The hole 121 of the damper 12 has two first sidewalk 1211 and two second sidewalk 1212. The two first sidewalls 1211 and the two second sidewalls 1212 correspond to each other, respectively. Besides, the two first sidewalk 1211 are adjacent to the two second sidewalk 1212, respectively, to form the hole 121.

When the damper 12 slips on from the second ends 1112 of the two first fixing members 111, the two first fixing members 111 pass through the hole 121 of the damper 12 and touch tightly against the two first sidewalls 1211 of the hole 121 for supporting the damper 12 and stretching the damper 12 tautly. The damper 12 according, to the present embodiment has a first surface 122 and a second surface 123 corresponding to each other. When the damper 12 slips on the two first fixing members 111, the first surface 122 of the damper 12 contacts the first side surface 101 of the cabinet body 10, and the two first hooks 112 hook on the second surface 123 of the damper 12. The first hook 112 has a blocking surface 1121, which blocks the second surface 123 so that the damper 12 is located between the first side surface 101 of the cabinet body 10 and the blocking surface, 1121 of the first hook 112. In other word, the damper 12 is fixed on the cabinet body 10 by means of the first fixing structure 11. In addition, the first hook 112 further has an incline 1122 opposite to the blocking surface 1121 and inclined by an angle with respect to the blocking surface 1121. The incline 1122 of the first hook 112 makes the damper 12 slip on the first fixing member 111 with ease.

Refer to FIGS. 3 and 4. The two dampers 12 described above are disposed on two identical second fixing structures 13. Here, the detailed structure and the assembly method with the corresponding damper 12 of only the second fixing structure 13 located on the right of the housing 2 will be described. The second fixing structure 13 is composed by two second fixing members 131. Each second fixing member 131 has a first end 1311 and a second end 1312. The first end 1311 of the second fixing member 131 is disposed on the inner surface of the housing 2 of the electronic device. The second end 1312 of the second fixing member 131 has a positioning part 13121. A fixing part 124 is disposed on the outer surfaces of the two first sidewalls 1211 of the damper 12, respectively. When the damper 12 is disposed between the two second fixing members 131, the two positioning parts 13121 of the two second fixing members 131 are disposed on the two fixing parts 124 of the damper 12, respectively. Thereby, the cabinet body 10 is disposed on the two second fixing members 131 via the damper 12 located in the first fixing structure 11 for fixing the housing 2 of the cabinet body 10. In the following, the embodiment how the first fixing structure 11, the damper 12, and the second fixing structure 13 mitigate the vibrations of the cabinet body 10 in various directions when the cabinet body 10 vibrates will be described.

When the speaker cabinet 1 is in use, the cabinet body 10 generates vibration in various directions. The vibration of the cabinet body 10 in the X-direction, namely, the left-and-right reciprocating movement, drives the first fixing structure 11 and the damper 12 located on the first fixing structure 11 to vibrate in the X-direction. When the cabinet body 10 vibrates to the right, the cabinet body 10 generates a rightward action force and drives the first fixing structure 11 and the damper 12 located on the first fixing structure 11 to vibrate to the right. At this moment, the two second fixing members 131 fix the two sidewalls 1211 of the damper 12. The action force of the cabinet body 10 deforms the damper 12 rightwards with respect to the two second fixing members 131. Due to its material and shape properties, the damper 12 generates a leftward counterforce, which reduces the deformation of the damper 12 and cancels out the action force of the cabinet body 10 for mitigating the rightward vibration of the cabinet body 10.

The two second fixing members 13 are flexible, enabling them to shake to the right as the damper 12 vibrates. Besides, the two second fixing members 13 also produces a leftward recovery force, which can cancel out the action force generated by the cabinet body 10 for avoiding the excessive rightward vibration of the cabinet body 10 as well as facilitating the damper 12 to mitigate the rightward vibration of the cabinet body 10. In the above, mitigating the rightward vibration of the cabinet body 10 is used as an example. The damper 12 can also mitigate the leftward vibration of the cabinet body 10. The details will not be described again. Accordingly, the damper 12 can mitigate the vibrations of the cabinet body 10 in the X-direction.

The cabinet body 10 vibrates in the Y-direction, namely, the forward-and-backward reciprocating movement. The cabinet body 10 drives the first fixing structure 11 and the damper 12 located on the first fixing structure 11 to vibrate in the Y-direction. When the cabinet body 10 vibrates forwards, it produces a forward action force. The cabinet body 10 drives the two first fixing members 111 and the damper 12 located, on the two first fixing members 111 to vibrate forwards. The two first fixing members 111 and the two second fixing members 131 located on the inner and outer sides, respectively, of the damper 12 are flexible and able to shake forward as the damper does. The two first fixing members 111 and the two second fixing members 131 then generate a recovery force thanks to their flexibility. The second fixing members 131 located in front of the damper 12 touches against the damper 12 by means of their recovery force and hence canceling out a portion of the action force of the cabinet body 10. Thereby, the cabinet body 10 can be free from excessive forward vibrations and thus mitigating the vibrations of the cabinet body 10. When the two second fixing members 131 touch against the damper 12 by means of the recovery force, the damper is moved backwards, which drives the flexible first fixing members 111 to move within the damper 12 for helping mitigating the forward vibrations of the cabinet body 10.

It is known from the above that by the collocation of the flexible first and second fixing structures 11, 13 with the damper 12, the vibrations of the cabinet body 10 in the Y-direction can be mitigated. There is a cushioning space between the two first fixing members 111. When the damper 12 is driven by the recovery three of the two second fixing members 131, the flexible two first fixing members 111 are driven to shake within the cushioning space, and thus facilitating mitigating the vibrations of the cabinet body 10 in the Y-direction.

The cabinet body 10 vibrates in the Z-direction, namely, the up-and-down reciprocating movement. The cabinet body 10 drives the first fixing structure 11 and the damper 12 located on the first fixing structure 11 to vibrate in the Z-direction. For example, when the cabinet, body 10 vibrates upwards, the cabinet body 10 generates an upward action force, which drives the first fixing structure it and the damper 12 disposed on the first fixing structure 11 to vibrate upwards. The both sides of the damper 12 are fixed on the two second fixing members 131. The action force of the cabinet body 10 deforms the damper 12 upwards. Meanwhile, due to its material and shape properties, the damper 12 generates a downward counterforce, which reduces the deformation of the damper 12 and cancels out the action three of the cabinet body 10 for mitigating the upward vibration of the cabinet body 10. It is thereby known from above that the damper 12 can mitigate the upward as well as downward vibrations of the cabinet body 10.

It is known from the above description that, in terms of the coordination among the first fixing structure 11, the damper 12, and the second fixing structure 13 in the speaker cabinet 1 according to the present embodiment, the cabinet body 10 can be fixed on the housing by merely using two fixing structures. In addition, when the cabinet body 10 vibrates, the problem of inclination towards an unpredictable direction will not occur, and thus avoiding noises caused by the contacts with the other components in the housing 2. Besides, the damper 12 deforms owing to the vibrations produced by the cabinet body 10. By means of the counterforce generated by the damper 12, the vibration of the cabinet body 10 can be mitigated. The first and second fixing structures 11, 13 are flexible, and thus facilitating the damper 12 to mitigate the vibrations produced by the cabinet body 10.

Refer again to FIGS. 3 and 4. The positioning parts 13121 of the second fixing member 131 are two projection members 13122. The fixing part 124 of the damper 12 includes a groove 1241 and a clamping block 1242. When the damper 12 is disposed on the two second fixing members 131, the two projection members 13122 of each second fixing member 131 clamp the clamping block 1242 of the damper 12 from top and bottom. The groove 1241 has two corresponding sidewalls 12411, which extend outwards from the first and second surfaces 122, 123 of the damper 12, respectively, and block the projection members 13122 from escaping towards the first and second surfaces 122, 123 of the damper 12. In other words, the two sidewalls 12411 are limiting surfaces for limiting the projection members 13122 in the groove 1241 and avoiding the projection members 13122 from escaping from the groove 1241 and thus fixing the damper 12 of the cabinet body 10 on the two second fixing members 131. The two contact surfaces on the clamping block. 1242 with the two projection members 13122 described above have to bevel 1243, respectively, so that the two projection members 13122 can slide into the groove 1241 along the two bevels 1243 and clamp the clamping block 1242. Thereby, the positioning part 13121 is easy to be assembled to the fixing part 124.

Figure 5:
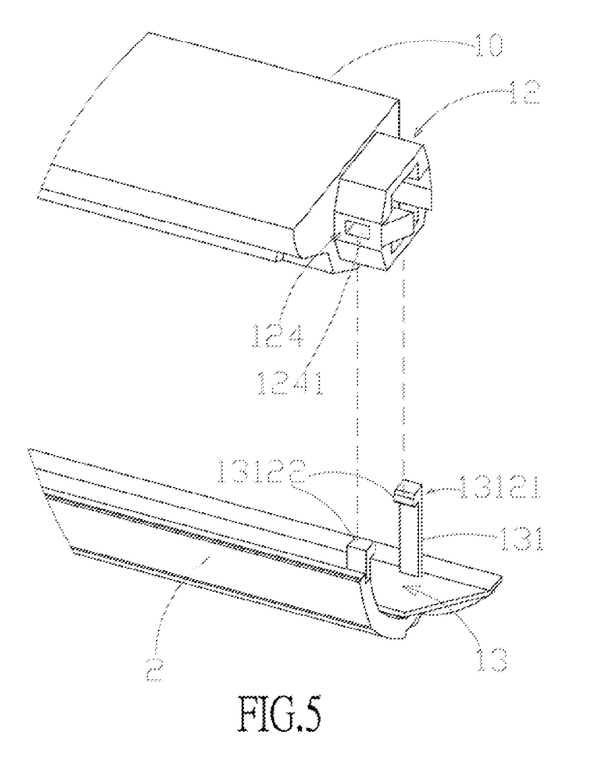
FIG. 5 shows an exploded view according a second embodiment of the present disclosure.

FIG. 5 shows an exploded view according a second embodiment of the present disclosure. As shown in the figure, the structures of the positioning part 1312 of the second fixing member 131 and the fixing part 124 of the damper 12 are difference form the ones in the previous embodiment. The fixing part 124 of the damper 12 according to the present embodiment is a groove 1241, while the positioning part 13121 of the second fixing member 131 is a projection member 13122. The projection member 13122 is wedged in the groove 1241. In the above, two structures for disposing the positioning part 13121 in the fixing part 124 are disclosed. Both of the two structures can fix the damper 12 disposed on the cabinet body 10 on the two second fixing members 131. The structures of the positioning part 13121 and the fixing part 124 disclosed in the first embodiment have a better performance of fixing the damper 12 by the two second fixing members 131. In addition, the structures according to the first embodiment also have a better effect on assisting the damper 12 to mitigate the Z-direction vibrations of the cabinet body 10.

Figure 6:
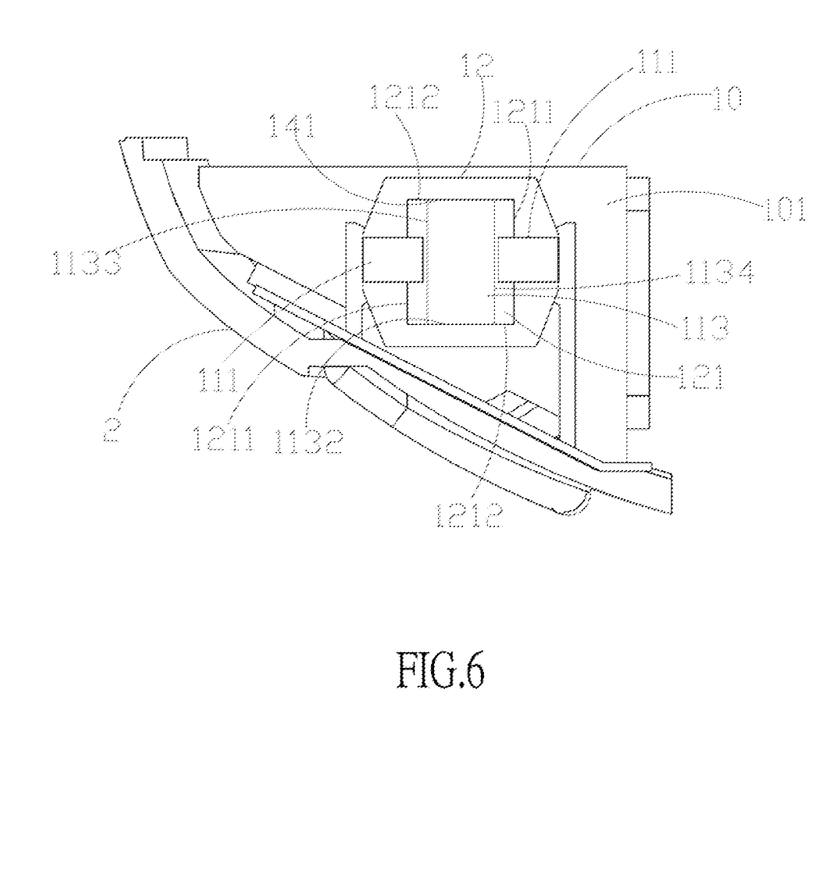
FIG. 6 shows a side view of the speaker cabinet according a third embodiment of the present disclosure.

FIG. 6 shows a side view of the speaker cabinet according a third embodiment of the present disclosure. As shown in the figure, each first fixing structure 11 further includes a position limiting member 113 located between the two first fixing members 111. Since the two position limiting members 113 according to the present embodiment have identical structures, the position limiting member 113 located on the first side surface 101 will be described in details. When the damper 12 slips on the two first fixing members 111, the position limiting member 113 passes through the hole 121 of the damper 12 as well with its top and bottom surfaces 1131, 1132 touch against the two second sidewalk 1212 of the damper 12, respectively, for limiting the location in height of the damper 12 on the first side surface 101 of the cabinet body 10. The width of the position limiting member 113 is less than the distance between the two first fixing members 111. In other words, there is a cushioning space between the left side surface 1133 of the position limiting member 113 and the damper 12, and the right surface 1134 of the position limiting member 113 and the damper 12, respectively. The cushioning, spaces are provided for movements of the two flexible first fixing members.

Figure 7:
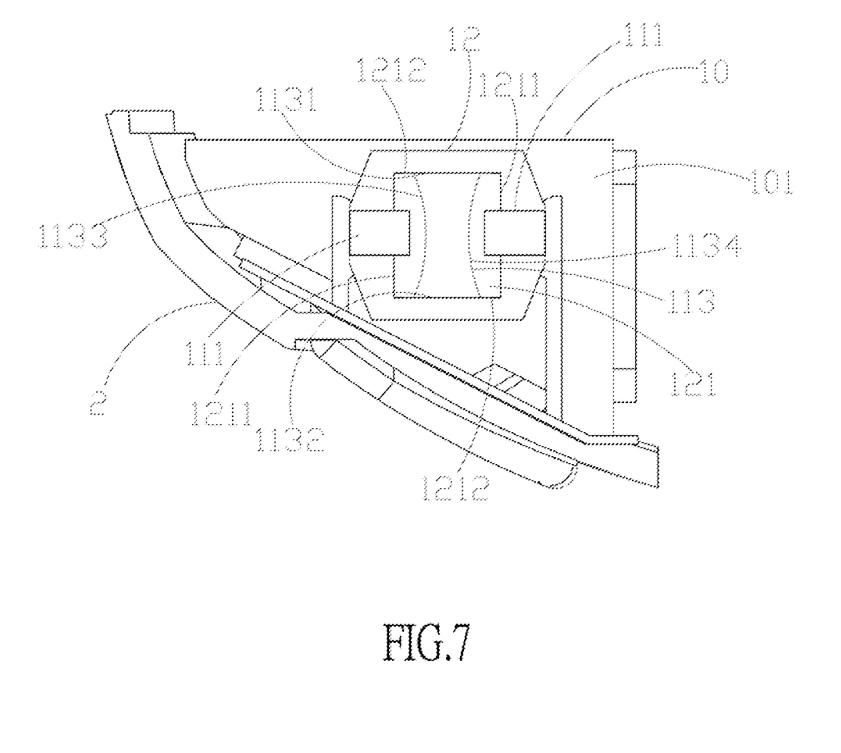
FIG. 7 shows a side view of the speaker cabinet according a fourth embodiment of the present disclosure.
Figure 8:
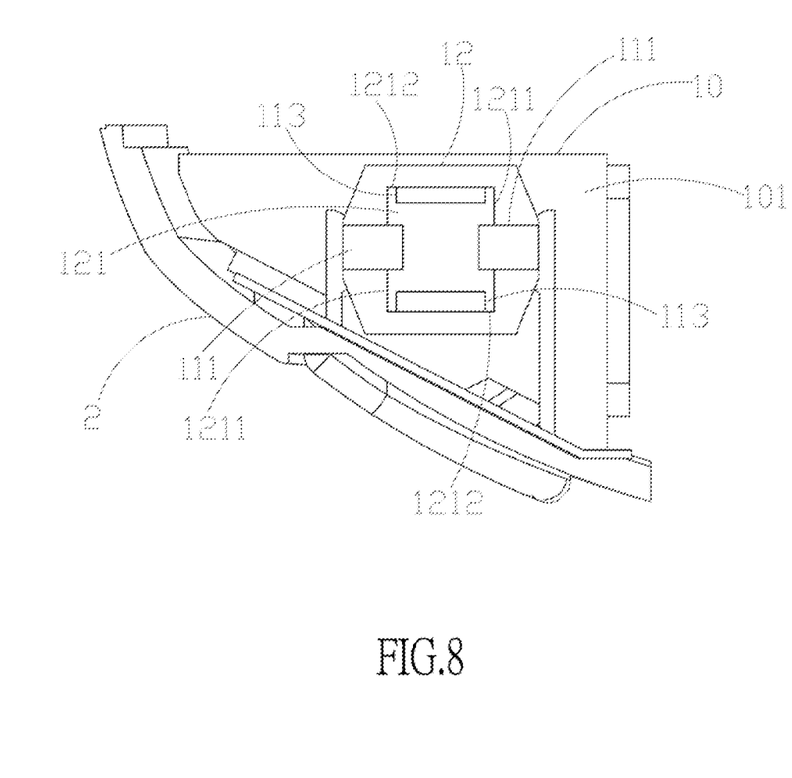
FIG. 8 shows a side view of the speaker cabinet according a fifth embodiment of the present disclosure.

The position limiting member 113 according to the present embodiment is a rectangular block. Referring to FIG. 7, the left side surface 1133 and the right side surface 1134 of the position limiting member 113 are concave for increasing the cushioning space between the first fixing member 111 and the left or right side surface 1133, 1134. Besides, referring to FIG. 8, the above embodiment adopts a single position limiting member 113. It is of course possible to adopt two slab-shaped position limiting members 113 disposed on the first side surface 101 and the second side surface of the cabinet body 10, respectively. The two position limiting members 113 touch the two second sidewalls 1212 of the hole 121 of the damper 12, respectively. The cushioning space of the two first fixing members 111 is located between the two position limiting members 113. Thereby, the two first fixing members 111 are allowed to have a larger range for movements without contacting the two position limiting members 113.

Figure 9:
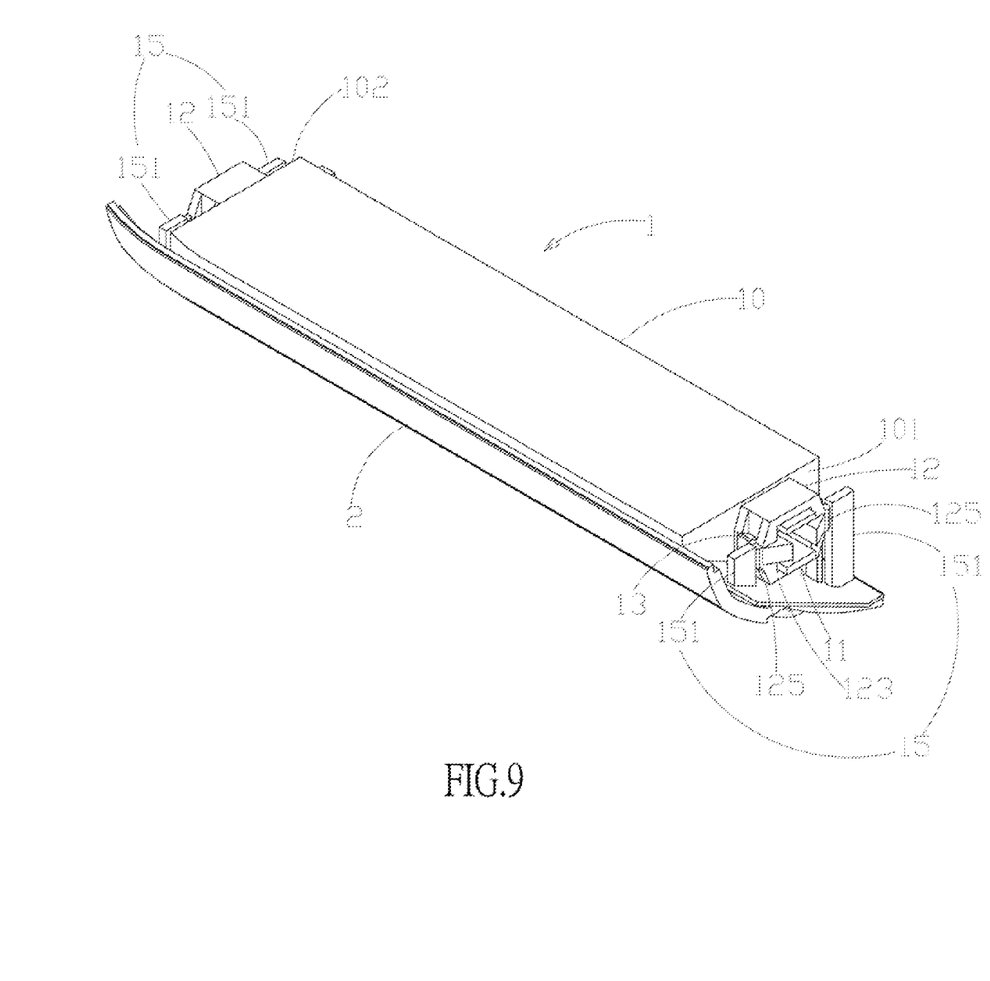
FIG. 9 shows a three-dimensional view of the speaker cabinet according a sixth embodiment of the present disclosure.

FIG. 9 shows a three-dimensional view of the speaker cabinet according a sixth embodiment of the present disclosure. As shown in the figure, the housing 2 according to the present disclosure further have two position limiting structures 15. Each of the position limiting, structure 15 is located on the side corresponding to the second fixing structure 13 and corresponds to the cabinet body 10. The two position limiting structures 15 are identical. Here, the position limiting structure 15 adjacent to the first side surface 101 of the cabinet body 10 is described in details. The position limiting structure 15 according to the present embodiment includes two position limiting pillars 151 located on one side of the two second fixing members 131 and corresponding to the cabinet body 10. In addition, the distance between the two position limiting pillars 151 is equal to the width of the damper 12. The two position limiting pillars 151 according to the present embodiment can touch against the two first sidewalls 1211 of the damper 12 for preventing excessive vibrating amplitude of the cabinet body 10 as well as excessive bending of the two second fixing members 131. The second surface 123 of the damper 12 further has two blocking convex parts 125 extending outwards from the both sides of the second surface 123 of the damper 12, respectively, and corresponding to the two position limiting pillars 151. The two position limiting pillars 151 touch against the two blocking convex parts 125 of the second surface of the damper 12 for preventing, excessive vibrating amplitude of the cabinet body 10. Nonetheless, the two position limiting pillars 151 will not influence the mitigating performance of the damper 12 and the two second fixing members 131 on the vibrations of the cabinet body 10.

Figure 10:
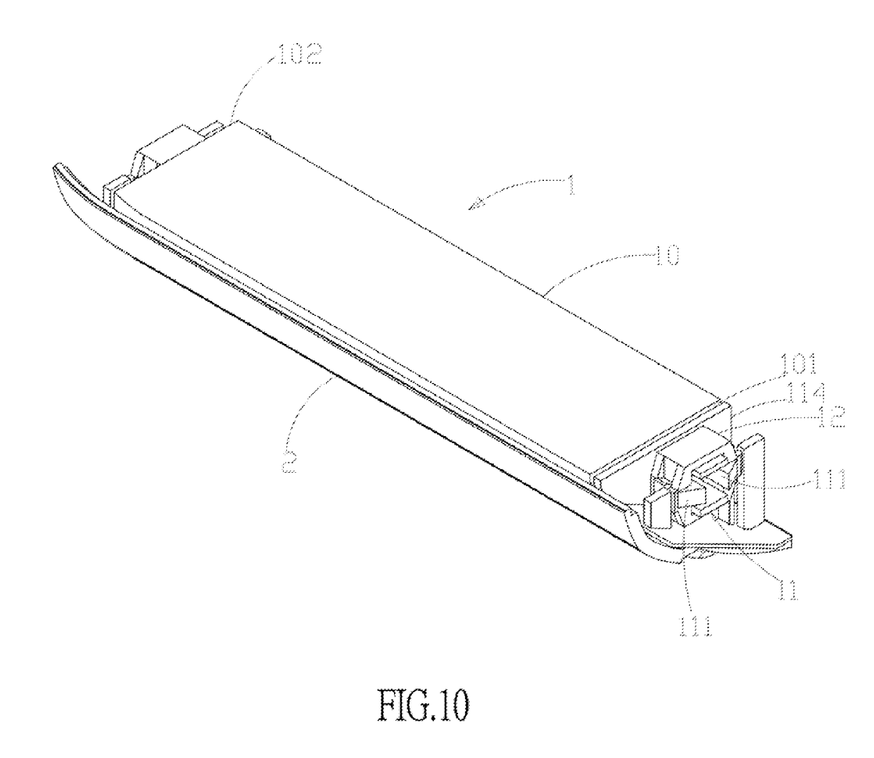
FIG. 10 shows a three-dimensional view of the speaker cabinet according a seventh embodiment of the present disclosure.
Figure 11:
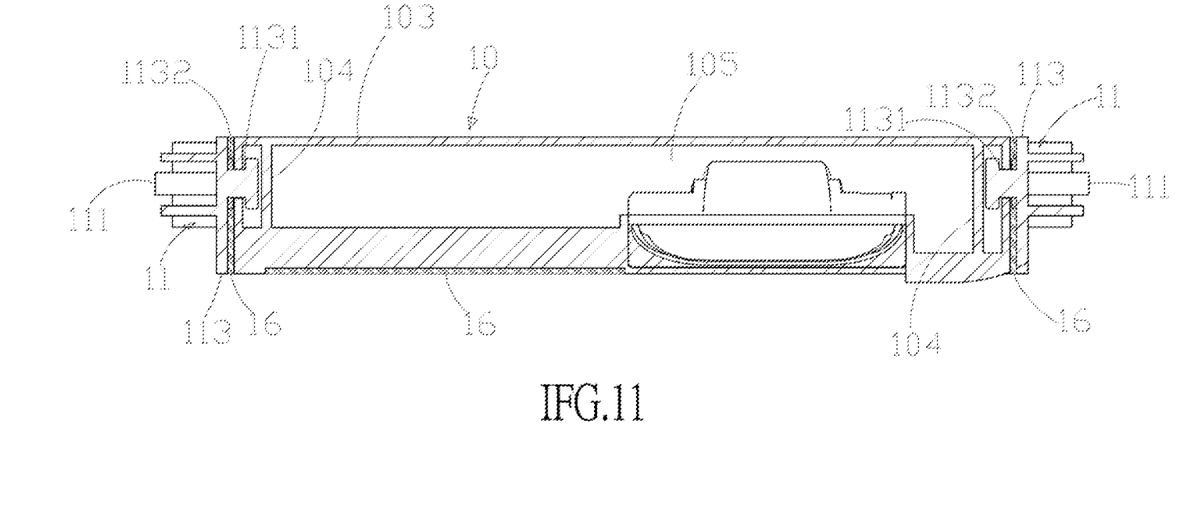
FIG. 11 shows a cross-sectional view of the speaker cabinet according the seventh embodiment of the present disclosure.
Figure 12:
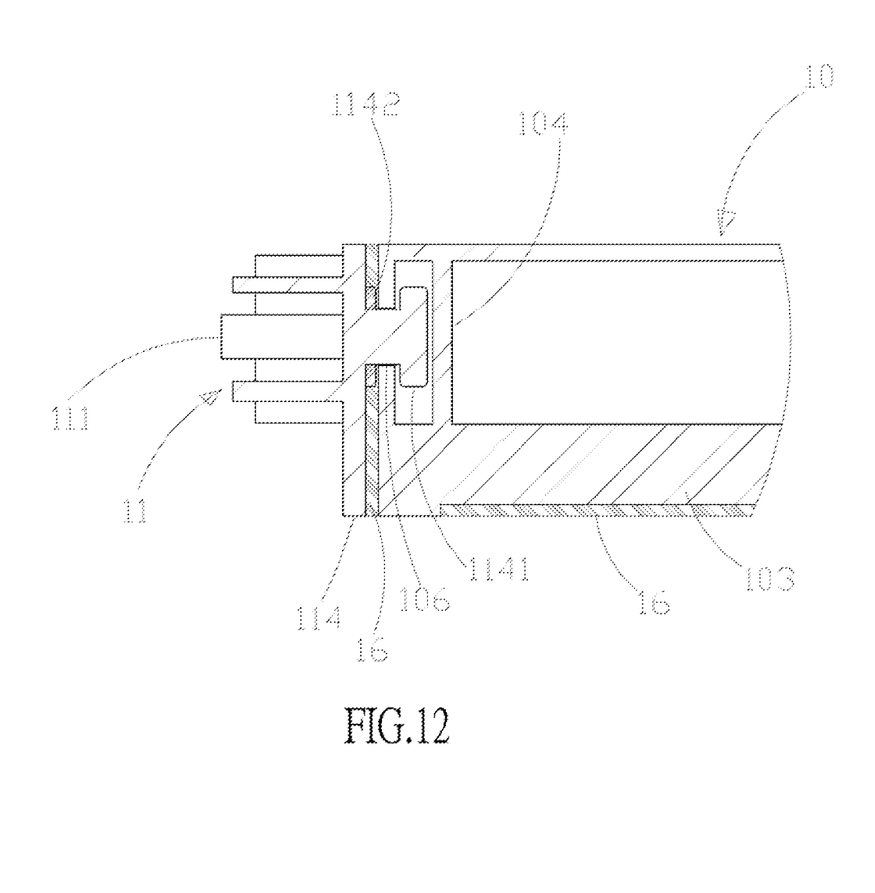
FIG. 12 shows a partially enlarged view of FIG. 11 according the seventh embodiment of the present disclosure.

FIGS. 10 to 12 show a three-dimensional view and a cross-sectional view of the speaker cabinet according a seventh embodiment of the present disclosure. As shown in the figure, the difference between the present embodiment and the previous one is that the first fixing structure 11 according to the present embodiment further includes a fixing base 114. The fixing base 114 has an axis 1141 on one side. The first side surface 101 of the cabinet body 10 has a pivotal hole 106. The axis 1141 is connected pivotally in the pivotal hole 106 of the first side surface 101 of the cabinet, body 10. The two first fixing members 111 are disposed on the other side of the fixing base 114. When the cabinet body 10 vibrates, it can rotate with respect to the first fixing structure 11 for mitigating the vibrations generated by the cabinet body 10. As the contact area between the fixing base 114 and the first side surface 101 of the cabinet body 10 is smaller, the friction therebetween is less. Thereby, the suffice of the fixing base 114 and the first side surfaces 101 of the cabinet body 10 have at least as convex part 1142, which can be convex ring, a convex dot, or a convex pillar. According to the present embodiment, the convex part 1142 is a convex ring and surrounds the axis 1141. Hence, the first side surface 101 contacts the convex part 1142 only, reducing the contact area between the cabinet body 10 and the fixing base 114. Accordingly, the friction between the cabinet body 10 and the fixing base 114 is reduced effectively, and thus the cabinet 10 can rotate smoothly with respect to the fixing base 144.

Refer again to FIG. 12. An absorbing vibration member 16 can be further disposed between the fixing base 114 and the first side surface of the cabinet body 10. The absorbing vibration member 16 can absorb the vibrations generated by the cabinet body 10 and avoiding collision, and hence the noises, of the cabinet body 10 on the fixing base 114 during vibrations. Nonetheless, the cabinet body 10 may contact the housing 2 or the other internal components during the rotating process. Thereby, at least an absorbing vibration member 16, such as foaming materials, is attached to the location where the cabinet body 10 contacts with the housing 2 or the other internal components. The absorbing vibration member 16 can absorb the vibrations generated by the cabinet body 10 and cushioning the excessive swing, of the cabinet body 10 during rotation. Thereby, collisions on the housing 2 or the other internal components can be avoided.

The cabinet body 10 has a case 103. Because the axis 1141 of the fixing base 114 is connected pivotally in the pivotal hole 106 of the cabinet body 10, the hermeticity of the cabinet body 10 is inferior, and thus lowering the voice quality output by the cabinet body 10. For enhancing the hermeticity of the cabinet body 10, the case 103 further has two spacers 104, which space a resonant cavity 105 not communication with the pivotal hole 106 of cabinet body 10. Thereby, the cabinet body 10 has a hermetically sealed resonant cavity 105 and hence preventing lowering of voice quality output by the cabinet body 10.

To sum up, the present disclosure relates to a speaker cabinet for electronic device. The speaker cabinet mainly uses the first and second fixing structures to fix the damper and the cabinet body on the housing of the electronic device. The first and second fixing structures support the damper for avoiding inclination towards an unpredictable direction owing to the deformation of the damper during vibrations of the cabinet body and thus reducing the possibility that the cabinet body collides the housing or the other internal components and produces noises. In addition, the manufacturing cost and the assembly time can be further reduced. In the speaker cabinet, the vibrations produced by the cabinet body are mitigates through the damper. Besides, the flexible first and second fixing structures further assist the damper to mitigate the vibrations produced by the cabinet body. Moreover, the cabinet body can rotate with respect to the two first fixing structures. This also mitigates the vibrations produced by the cabinet body.

Accordingly, the present disclosure conforms to the legal requirements owing to its novelty, nonobviousness, and utility. However, the foregoing description is only embodiments of the present disclosure, not used to limit the scope and range of the present disclosure. Those equivalent changes or modifications made according to the shape, structure, feature, or spirit described in the claims of the present disclosure are included in the appended claims of the present disclosure.

The invention claimed is:

1. A speaker cabinet for electronic device, disposed in an electronic device, and comprising:
   a cabinet body, having two side surfaces on both sides and corresponding to each other;
   two first fixing structures, disposed on said two side surfaces of said cabinet body, respectively;
   two dampers, each damper having a hole, and said first fixing structures passing through said holes of said two dampers, respectively; and
   two second fixing structures, respectively disposed on side of a housing of said electronic device, said housing disposed below said cabinet body, each of said second fixing structures including two symmetrically second fixing members clamping outside of each said corresponding dampers.

2. The speaker cabinet for electronic device of claim 1, wherein said first fixing structure includes two symmetrically first fixing members, an end of each said first fixing member having a first hook, said two first fixing members passing through said hole of said damper and touching against a sidewall of said hole, and said two first hooks hooking and blocking said damper.

3. The speaker cabinet for electronic device of claim 2, wherein said first fixing structure further includes a fixing base, having an axis on one side, said two first fixing members disposed on the other side of said fixing base, and said axis connected pivotally to a pivotal hole on said side surface of said cabinet body.

4. The speaker cabinet for electronic device of claim 3, wherein said first fixing structure further includes at least a convex part, disposed on one side of said fixing base, surrounding said axis, and contacting said side surface of said cabinet body.

5. The speaker cabinet for electronic device of claim 4, wherein said convex part is a convex ring, a convex dot, or a convex pillar.

6. The speaker cabinet for electronic device of claim 3, and further comprising an absorbing vibration member disposed between said fixing base and said cabinet body.

7. The speaker cabinet for electronic device of claim 3, wherein said cabinet body further comprises:
   a case; and
   two spacers, disposed in said case, and spacing a resonant cavity.

8. The speaker cabinet for electronic device of claim 2, wherein said first fixing structure further includes a position limiting member, disposed on said side surface of said cabinet body, located between said two first fixing members, and each said position limiting member passing through said hole of said damper and touching against said sidewall of said hole.

9. The speaker cabinet for electronic device of claim 8, wherein said position limiting member is a position limiting block with a width less than the distance between said two first fixing members.

10. The speaker cabinet for electronic device of claim 9, wherein the two sides of said position limiting block corresponding to said two first fixing members are concave.

11. The speaker cabinet for electronic device of claim 2, wherein said first fixing structure further includes two position limiting members, disposed on said side surface of said cabinet body, located between said two first fixing members, and said two position limiting members passing through said hole of said damper and touching against said sidewall of said hole, respectively.

12. The speaker cabinet for electronic device of claim 1, wherein one end of each said second fixing member having a positioning part disposed on a fixing part of said damper.

13. The speaker cabinet for electronic device of claim 12, wherein said fixing part includes a groove and a clamping block, said groove having two corresponding sidewalls, said clamping block disposed in said groove, said positioning part including two projection members, said two projection members clamping said clamping block, and said two sidewalls of said groove limiting said two projection members within said groove.

14. The speaker cabinet for electronic device of claim 13, wherein the two contact surfaces on said clamping block with said two projection members have a bevel, respectively.

15. The speaker cabinet for electronic device of claim 12, wherein said fixing part is a groove, said positioning part is a projection member, said projection member disposed in said groove, said groove having two corresponding sidewalls, and said two sidewalls limiting said projection member within said groove.

16. The speaker cabinet for electronic device of claim 1, and further comprising two position limiting structures, disposed on said housing, and located on one side of said corresponding second fixing structure, respectively, and corresponding to said cabinet body for touching against said damper.

17. The speaker cabinet for electronic device of claim 16, wherein said position limiting structure includes two position limiting pillars touching against both sides of said damper.

18. The speaker cabinet for electronic device of claim 17, wherein said damper further includes two blocking convex part, disposed on both sides of said damper, respectively, corresponding to said two position limiting pillars, respectively, and said two position limiting pillars touching against said two blocking convex parts of said damper.

19. The speaker cabinet for electronic device of claim 1, and further comprising an absorbing vibration member disposed on the surface of said cabinet body corresponding to said housing.

\* \* \* \* \*